United States Patent
Evenson

(10) Patent No.: US 10,402,452 B1
(45) Date of Patent: Sep. 3, 2019

(54) DISTRIBUTED HASH TABLE BASED LOGGING SERVICE

(71) Applicant: Amazon Technologies, Inc., Seattle, WA (US)

(72) Inventor: Andrew Ross Evenson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 599 days.

(21) Appl. No.: 14/738,214

(22) Filed: Jun. 12, 2015

(51) Int. Cl.
*G06F 16/13* (2019.01)
*G06F 16/901* (2019.01)

(52) U.S. Cl.
CPC ........ *G06F 16/9014* (2019.01); *G06F 16/137* (2019.01)

(58) Field of Classification Search
CPC ..................... G06F 17/30949; G06F 17/30067
USPC ........................................................ 707/747
See application file for complete search history.

(56) References Cited

U.S. PATENT DOCUMENTS

| | | | |
|---|---|---|---|
| 9,250,759 B1* | 2/2016 | Commons | 715/772 |
| 9,372,879 B1* | 6/2016 | Evenson | |
| 2005/0157712 A1* | 7/2005 | Rangarajan et al. | 370/388 |
| 2006/0156064 A1* | 7/2006 | Damani et al. | 714/16 |

OTHER PUBLICATIONS

Sriram Ramabhadran et al., Prefix Hash Tree an Indexing Data Structure over Distributed Hash Tables, 2004, Semantic Scholar, 1-10.*

* cited by examiner

*Primary Examiner* — Jean B Fleurantin
(74) *Attorney, Agent, or Firm* — Lee & Hayes, P.C.

(57) ABSTRACT

A distributed hash table (DHT) based logging service utilizes a DHT to store an event log or another type of data. For example, applications can utilize the logging service to store data that logs aspects of their operation. A key/value storage service can provide access to the DHT. The data stored in the DHT can be organized into a "skipchain" data structure. The data structure includes nodes storing the data that are distributed across partitions of the DHT. Nodes in the data structure can identify "redundancy nodes" and "skip nodes." When a request is received to add new data to the skipchain data structure, a new node is stored in the DHT that includes the new data. A head node for the data structure is updated in the DHT. The head node can also be utilized to recover from a failure to write an internal node to the data structure.

20 Claims, 16 Drawing Sheets

SKIPCHAIN DATA STRUCTURE
INTERNAL DATA MODEL

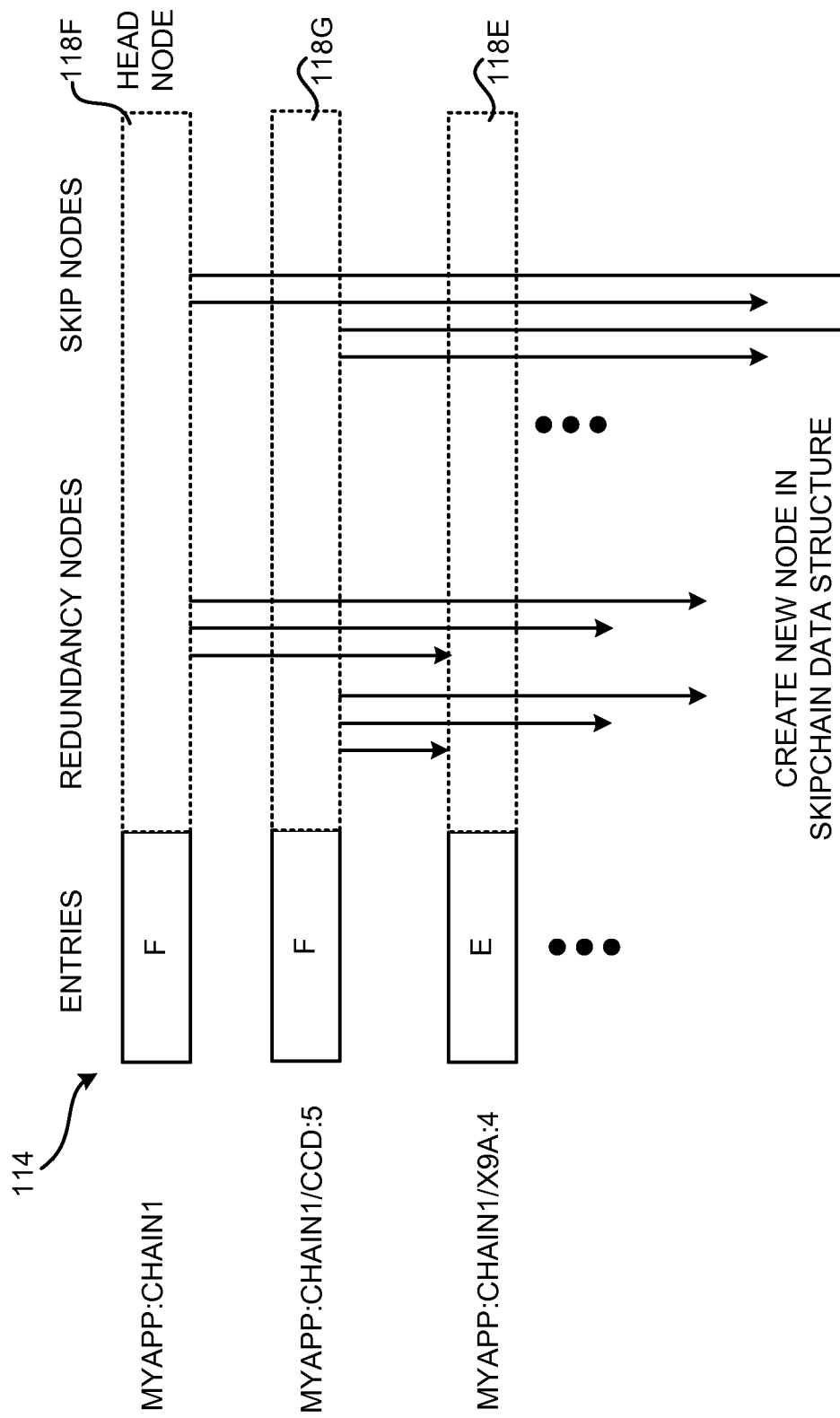

CREATION OF LISTS OF REDUNDANCY AND SKIP NODES

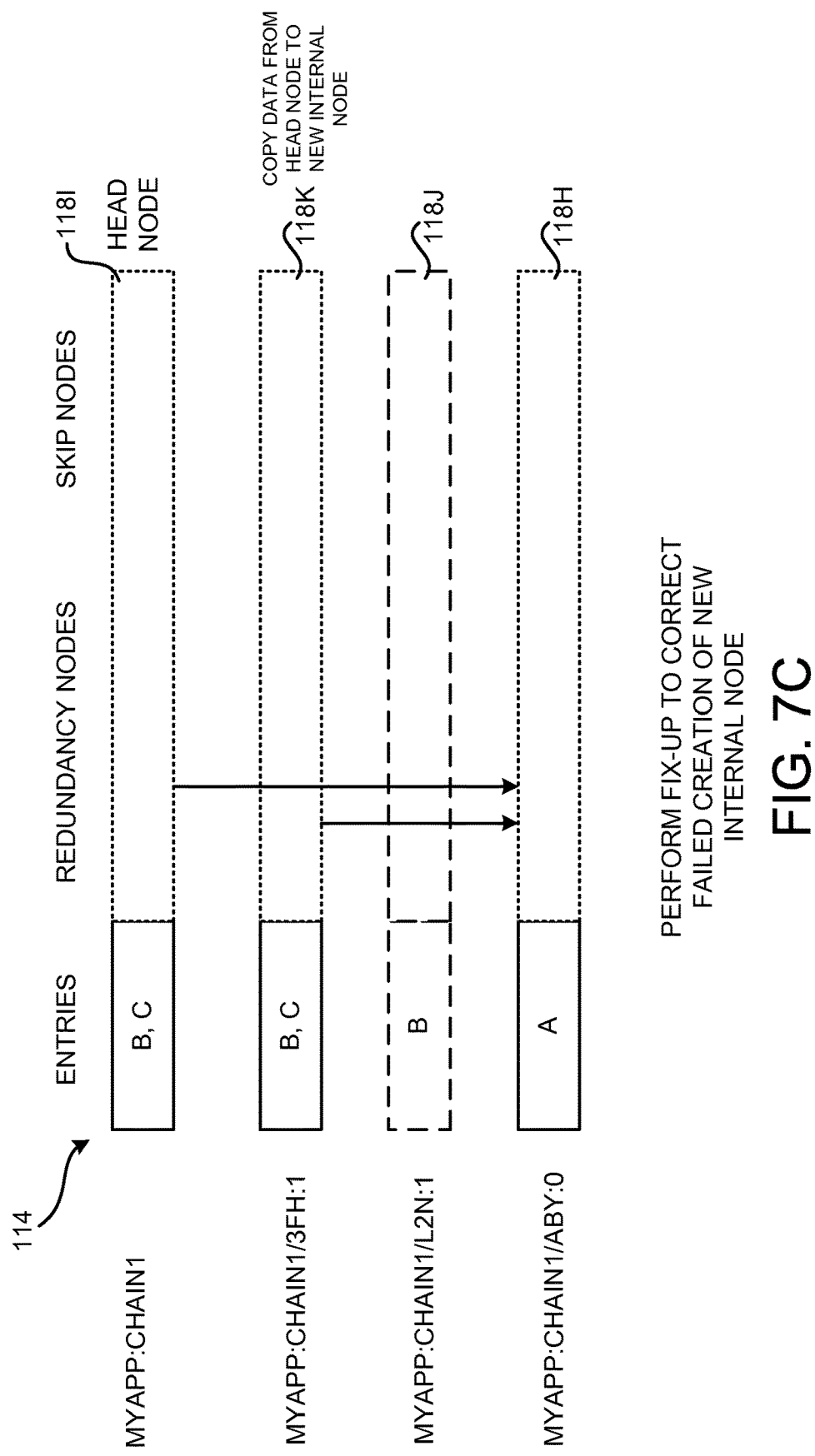

EXAMPLE SKIPCHAIN DATA STRUCTURE – PRE COMPACTION

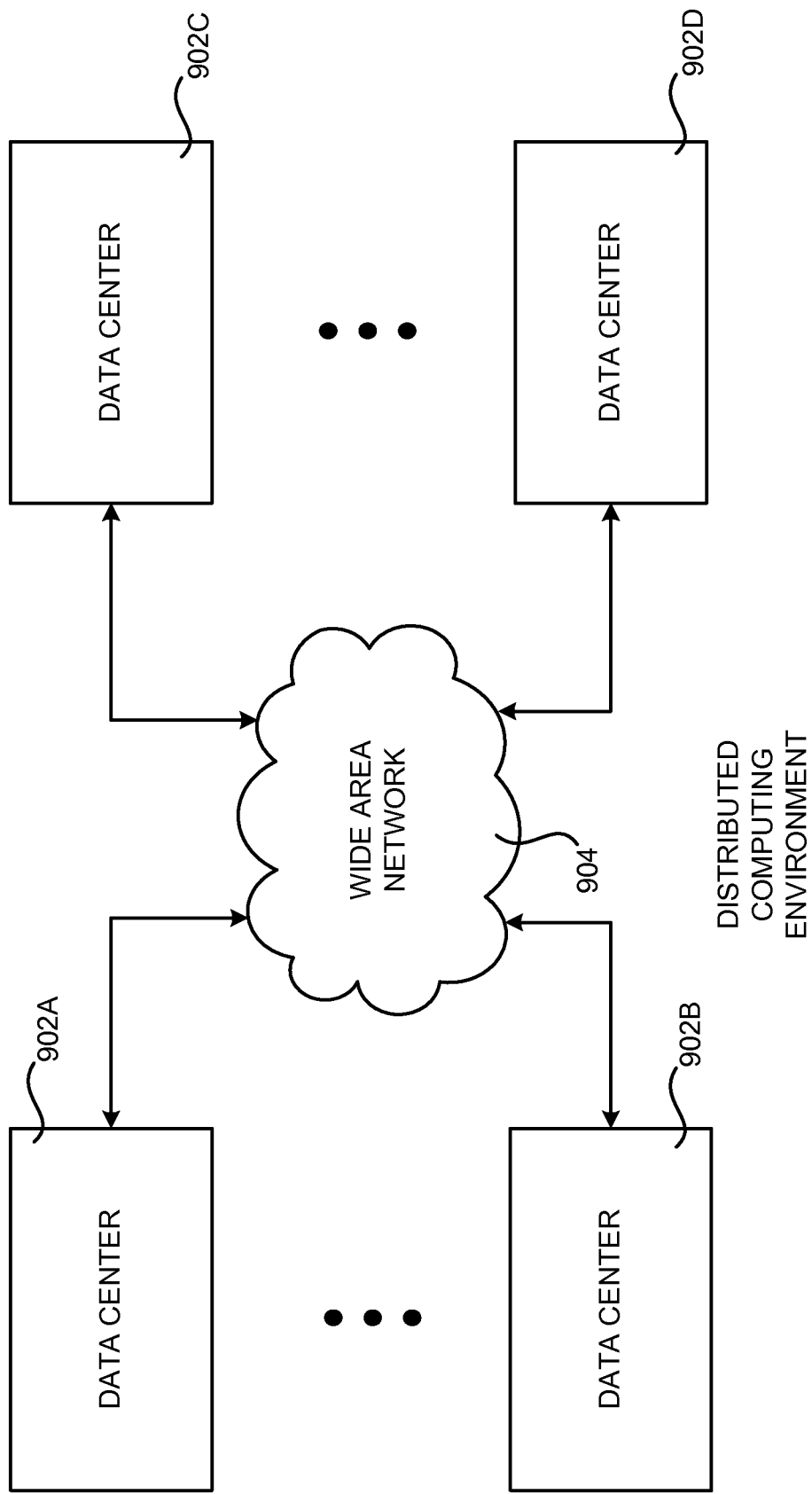

DISTRIBUTED HASH TABLE BASED LOGGING SERVICE

BACKGROUND

Large scale distributed application programs commonly need access to a highly available distributed data store for storing (i.e. logging) and retrieving data that describes aspects of their operation. For example, and without limitation, a large scale electronic commerce ("e-commerce") service might utilize a large scale distributed event log to create and maintain a log of events taking place with regard to customer orders, such as the creation, deletion, and/or modification of such orders. Given the typically critical nature of the data stored by distributed application programs, such a distributed event log must be capable of durably storing event data, with very low latency, and must also be capable of permitting the retrieval of the stored event data with very high availability.

It is with respect to these and other considerations that the disclosure made herein is presented.

BRIEF DESCRIPTION OF THE DRAWINGS

FIG. 4 is a data structure diagram showing aspects of the creation of a new node in an example skipchain data structure utilized by a distributed hash table based logging service in one configuration disclosed herein;

FIGS. 7A-7C are data structure diagrams showing aspects of one mechanism disclosed herein for handling the failure of the creation of a new internal node in a skipchain data structure, in one particular configuration disclosed herein;

FIG. 9 is network diagram showing aspects of a distributed computing environment in which the configurations presented herein might be implemented;

DETAILED DESCRIPTION

Figure 1:
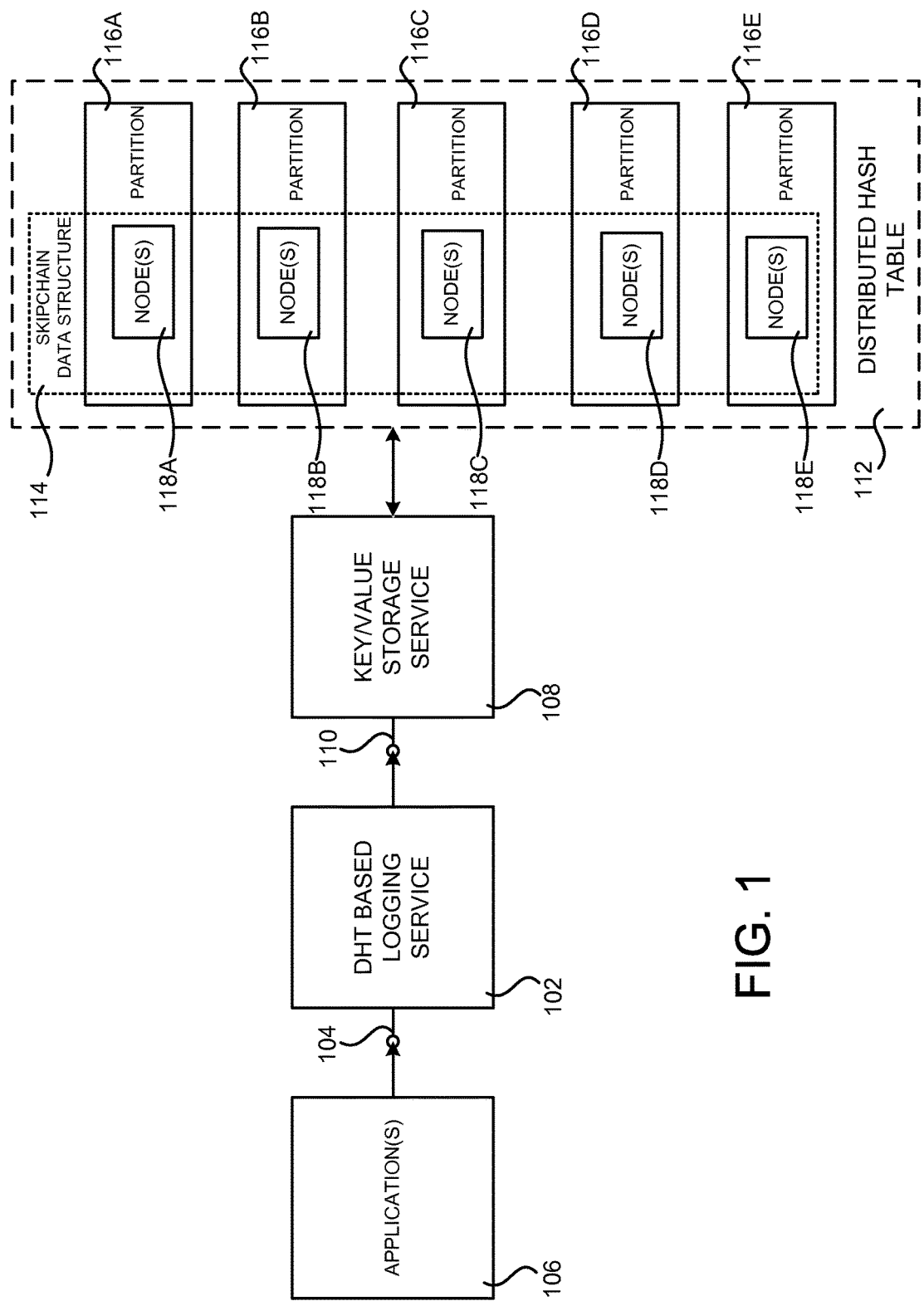
FIG. 1 is a network services architecture diagram providing an overview of a system disclosed herein for providing a distributed hash table based logging service, according to one configuration presented herein.

The following detailed description is directed to technologies for providing a distributed hash table ("DHT") based logging service. Utilizing the technologies described herein, a distributed event log can be provided that is capable of durably storing event data, with very low latency, and of permitting the retrieval of the stored event data with very high availability. An implementation of the technologies disclosed herein can also be utilized to store other types of data and might also provide other benefits not specifically mentioned herein.

According to one aspect presented herein, a DHT based logging service is disclosed herein that utilizes a DHT to store event data. Applications can utilize functionality provided by the DHT based logging service to store data that logs aspects of their operation and/or to store other types of data. For example, and without limitation, a large scale e-commerce service might utilize functionality exposed by the DHT based logging service to create and maintain a log that includes log entries including data describing events taking place with regard to customer orders, such as the creation, deletion, and/or modification of such orders.

A key/value storage service provides access to the DHT in one configuration. Data in a DHT is organized into a set of distributed partitions that store the data. In order to write data to a DHT, a key is used to identify a partition at which the data should be stored. In order to retrieve data from a DHT, a client provides a key for the data to be retrieved, the key is used to identify the partition from which the data is to be retrieved, and the identified partition is queried for the data. The partitions in a DHT can reside on different server computers to increase capacity, on multiple server computers to increase redundancy, or both, so long as a scheme exists for identifying the appropriate partition for storing, retrieving, updating and deleting data.

In one particular configuration, the event data is organized into a "skipchain" data structure, which might be referred to herein simply as "a data structure", that is stored in a DHT. The skipchain data structure includes immutable nodes for storing the data, such as entries in an event log, that are distributed across partitions of the DHT. In one configuration, nodes in the skipchain data structure include data identifying the node (i.e. a node identifier ("ID")), a sequence number identifying the node's position in the data structure, and data identifying the data structure itself, which might be referred to herein as a "chain ID." Nodes can also include data identifying a number of data entries, such as entries in an event log, that are located in previous nodes.

Nodes in the skipchain data structure can also include data identifying one or more "redundancy nodes." Redundancy nodes are nodes IDs for one or more sequential subsequent nodes in the data structure. For example, and without limitation, a node might identify the closest three (or other number) nodes in the data structure as redundancy nodes. Nodes in the skipchain data structure can also include data identifying one or more "skip nodes." Skip nodes are node IDs for nodes in the skipchain data structure that are organized such that a distance in nodes between any two skip nodes is a base-two value. The skip nodes are selected deterministically rather than probabilistically. Organizing the skip nodes in this manner allows the skipchain data structure to be efficiently searched for requested data using a binary search algorithm. Additional details regarding the selection and utilization of the skip nodes will be described below.

When a request is received to add new data (which might be referred to herein as a "data entry" or, in the case of a log, a "log entry") to the skipchain data structure, such as a new log entry, a new node is stored in the DHT that includes the new data entry. The new node specifies at least one redundancy node that points to the last internal node (i.e. a non-head node) that was added to the data structure. The new node can also specify one or more skip nodes. The redundancy nodes and skip nodes can be generated based, at least in part, on the contents of a previously stored head node for the data structure. The head node for the data structure is also updated in the DHT. The updated head node is a copy of the new node added to the data structure.

At the time a new internal node is to be written to the data structure, a determination can also be made as to whether the last internal node in the data structure was written successfully. If the last internal node in the data structure was not written correctly, data from the current head node can be added to the new node since the current head node is a copy of the last internal node written to the data structure. The new data for the new node is also written to the new node and persisted to the data structure in the DHT. In this way, recovery can be made from a failure to write a new internal node to the data structure. The data structure can also be compacted in some configurations utilizing a similar mechanism, which will be described in greater detail below.

Although the configurations described herein have been primarily presented in the context of the storage of log entries for a log, it should be appreciated that the configurations disclosed herein are not limited to storing log entries and that other types of data entries can be stored in a similar fashion. Additional details regarding the various components and processes described briefly above for providing a DHT based logging service will be presented below with regard to FIGS. 1-11.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The configurations described herein can be practiced in distributed computing environments, where tasks are performed by remote processing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a network services architecture diagram providing an overview of a system disclosed herein for providing a DHT based logging service 102, according to one configuration presented herein. As shown in FIG. 1, and described briefly above, the DHT based logging service 102 disclosed herein utilizes a DHT 112 to store event data and/or other types of data. Applications 106 can utilize functionality provided by the DHT based logging service 102 to store data that logs aspects of their operation and/or to store other types of data. For example, and without limitation, a large scale e-commerce application 106 might utilize functionality exposed by the DHT based logging service 102 to create and maintain a log in the DHT 112 that includes log entries including data describing events taking place with regard to customer orders, such as the creation, deletion, and/or modification of such orders. Other types of data can also be stored in a similar fashion.

In one particular configuration, a key/value storage service 108 maintains and provides access to the DHT 112. As discussed briefly above, data in the DHT 112 is organized into a set of distributed partitions 116A-116E (which might be referred to herein as the "partitions 116" or a "partition 116") that store the data. In order to write data to the DHT 112, a key is used to identify a partition 116 at which the data should be stored. In order to retrieve data from the DHT 112, a client (such as the DHT based logging service 102) provides a key for the data to be retrieved to the key/value storage service 108, the key is used to identify the partition 116 from which the data is to be retrieved, and the identified partition 116 is queried for the data.

The partitions in the DHT 112 can reside on different server computers (not shown in FIG. 1) to increase capacity, on multiple server computers to increase redundancy, or both, so long as a scheme exists for identifying the appropriate partition for storing, retrieving, updating and deleting data. Additionally, the nodes 118 of the DHT 112 might be distributed over a subset of the partitions 116 maintained by the key/value storage service 108. The nodes 118 can be distributed in a manner designed to minimize the impact of the failure of a particular host. Additionally, and as discussed in greater detail below, the nodes 118 in a DHT 112 can also be stored utilizing multiple different storage services. Details regarding the configuration of a data center and server computers for storing the nodes 118 and partitions 116 of the DHT 112 will be provided below with regard to FIGS. 9-11.

In one particular configuration, the data stored in the DHT 112 (such as log event data) is organized into a "skipchain" data structure 114, which might be referred to herein simply as "a data structure 114." The skipchain data structure 114 includes nodes 118A-118E (which might be referred to herein as the "nodes 118" or a "node 118") for storing the data, such as entries in an event log, that are distributed across the partitions 116 of the DHT 112. Details regarding one illustrative data structure for implementing the nodes 118 of the skipchain data structure 114 will be provided below with regard to FIG. 2.

As shown in FIG. 1, the DHT based logging service 102 can be configured to expose a network services application programming interface ("API") 104 for allowing the applications 106 to access aspects of its operation. For example, and without limitation, the API 104 can expose functionality for allowing an application to append entries to an event log and/or to read entries from an event log. When the skipchain data structure 114 is utilized to store another type of data, the API 104 might similarly provide functionality for reading and appending that type of data.

In a similar fashion, the key/value storage service 108 can also expose a network services API 110 for enabling the DHT based logging service 102 to write to and read from the skipchain data structure 114 stored in the DHT 112. The API 110 might also expose methods for performing other types of operations on the skipchain data structure 114 stored in the DHT 112 in other configurations. The DHT based logging service 102 and the key/value storage service 110 might also expose other types of interfaces for accessing their functionality in other configurations.

Additional details regarding the configuration of the skipchain data structure 114 will be provided below with regard to FIG. 3. Details regarding one mechanism for appending a new node to the skipchain data structure 114 will be provided below with regard to FIGS. 4 and 6. Details regarding one mechanism disclosed herein for recovering from the failure to write a new internal node 118 to the skipchain data structure 114 will be provided below with regard to FIGS. 7A and 7B. Details regarding one mechanism disclosed herein for compaction of the skipchain data structure 114 will be provided below with regard to FIGS. 8A and 8B.

Figure 2:
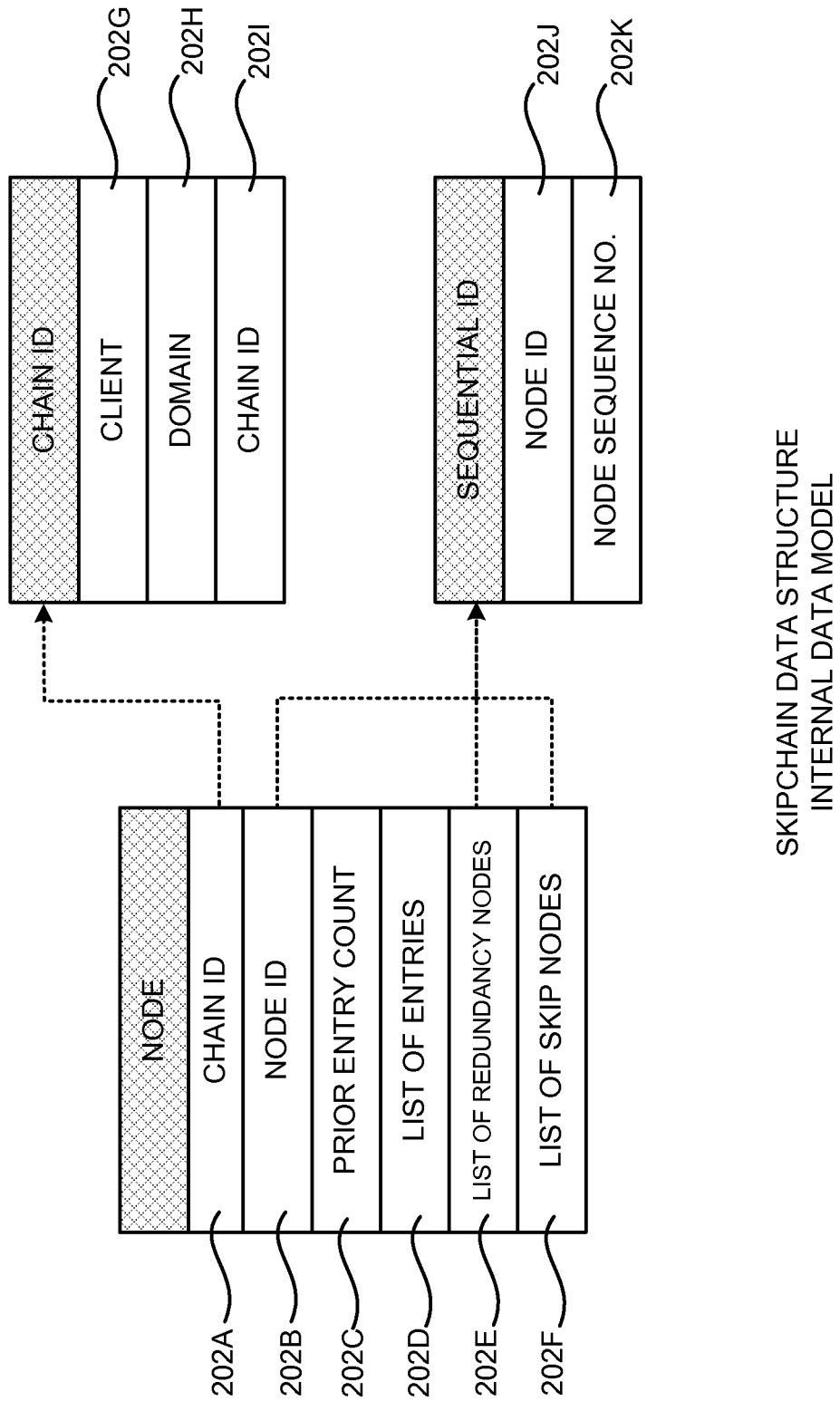
FIG. 2 is a data structure diagram showing aspects of an internal data model utilized to implement nodes in a skipchain data structure utilized by a distributed hash table based logging service in one configuration disclosed herein.

FIG. 2 is a data structure diagram showing aspects of an internal data model utilized to implement nodes 118 in a skipchain data structure 102 utilized by a DHT based logging service 102 in one configuration disclosed herein. As shown in FIG. 2, nodes 118 in the skipchain data structure 114 can be implemented utilizing a common data structure that includes a number of fields 202A-202K. In particular, a field 202A can be defined for storing data (which might be referred to herein as a "chain ID") that uniquely identifies the skipchain data structure 114. For example, the chain ID might be a random key for use in accessing a head node of the skipchain data structure 114 stored in the DHT 112. In one particular configuration, the field 202A includes fields 202G-202I storing a client ID, a domain, and the chain ID, respectively. It should be appreciated, however, that this configuration is merely illustrative and that other configurations can also be utilized.

As shown in FIG. 2, nodes 118 in the skipchain data structure 114 also include a field 202B defining an identifier for the node (which might be referred to herein as a "node ID"). In particular, in the configuration shown in FIG. 2, the node ID is defined in the field 202J. The node ID can be a key for use in retrieving the node 118 from the DHT 112. Additionally, a node sequence number for a node can also be defined by the field 202K. The node sequence number stored in the field 202K is a monotonically increasing value that uniquely identifies the position of a node 118 in the skipchain data structure 114. Nodes 118 in the skipchain data structure 114 can also include a field 202C for storing data identifying a number of data entries, such as entries in an event log, that are located in previous nodes 118.

Nodes 118 in the skipchain data structure 114 can also include a field storing data (e.g. a node ID and sequence number in one configuration) that identifies one or more "redundancy nodes." As mentioned briefly above, redundancy nodes are nodes IDs for one or more sequential nodes in the skipchain data structure 114. For example, and without limitation, a node 118 might identify the closest three (or other number) nodes 118 in the skipchain data structure 118 as redundancy nodes. The redundancy nodes can be utilized to navigate between nodes 118 of the skipchain data structure 114 from its front to its end. The redundancy nodes also provide redundancy in the event of a loss of one or more nodes 118 in the skipchain data structure 114. The redundancy nodes also provide the additional ability to perform parallel reads from nodes in the data structure 114.

Nodes 118 in the skipchain data structure 114 can also include a field 202F storing data (e.g. a node ID and sequence number in one configuration) identifying one or more "skip nodes." As discussed briefly above, skip nodes are node IDs for nodes 118 in the skipchain data structure 114 that are organized such that a distance in nodes 118 between any two skip nodes is a base-two value. Organizing the skip nodes in this manner allows the skipchain data structure 114 to be efficiently searched for requested data using a binary search algorithm. Additional details regarding the selection and utilization of the redundancy nodes and the skip nodes will be described below with regard to FIGS. 3-5C.

As shown in FIG. 2, nodes 118 in the skipchain data structure 114 can also include a field 202D containing the actual data to be stored in the skipchain data structure 114. For example, when the skipchain data structure 114 is utilized to store log entries, the field 202D can include a list of log entries. In this regard, it should be appreciated that multiple log entries can be stored in a single node 118 of the skipchain data structure 114. Similarly, multiple data entries of other types of data can also be stored in a single node 118 in other configurations. Additional details regarding the utilization of the various fields 202A-202K of the nodes 118 will be presented below.

Figure 3:
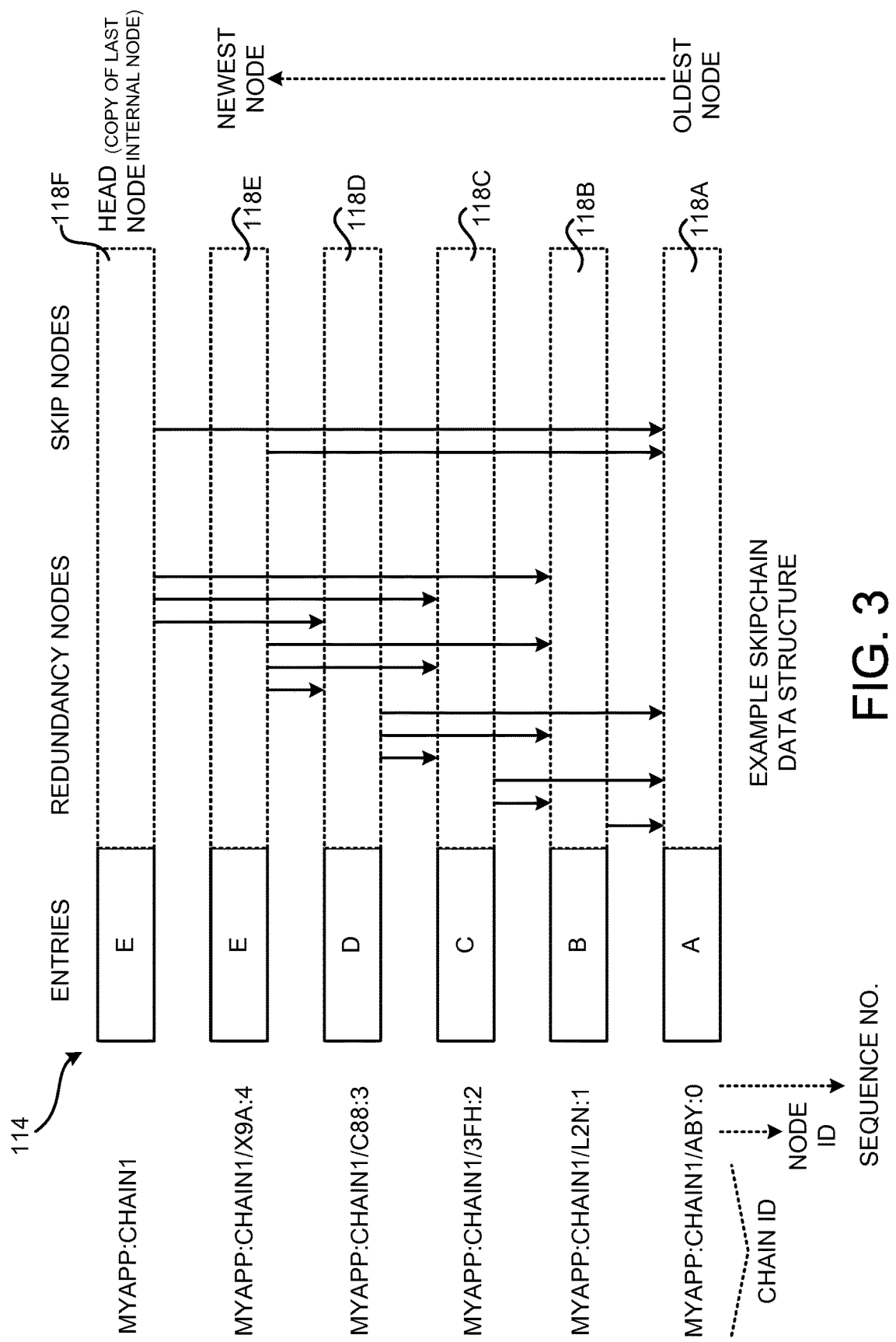
FIG. 3 is a data structure diagram showing aspects of an example skipchain data structure created by a distributed hash table based logging service in one configuration disclosed herein.

FIG. 3 is a data structure diagram showing aspects of an example skipchain data structure 114 created by a DHT based logging service 102 in one configuration disclosed herein. The example skipchain data structure 114 shown in FIG. 3 includes up to three redundancy nodes per node 118 and two skip nodes per node 118. It should be appreciated, however, that different numbers of redundancy and skip nodes might be defined for the nodes 118 in the skipchain data structure 114 in other configurations.

The example skipchain data structure 114 shown in FIG. 4 includes the nodes 118A-118F. The node 118A is the oldest node 118 in the skipchain data structure 114 and the node 118E is the newest internal node in the skipchain data structure 114. The skipchain data structure 114 also includes a head node 118F. The head node 118F provides an entry point into the end of the skipchain data structure 114 and is a copy of the last internal node 118 (i.e. the node 118E) in the skipchain data structure 114.

The node 118A in the skipchain data structure 114 shown in FIG. 3 is the first node created. The node 118A stores the data "A" and includes a node ID of "ABY" and a sequence number of 0. Because the node 118A is the first node 118 in the skipchain data structure 114, this node 118A does not identify any redundancy or skip nodes. The next node 118 added to the skipchain data structure 114 is the node 118B. The node 118B stores the data "B" and includes a node ID of "L2N" and a sequence number of 1. The node 118B also includes one redundancy node that points to the node 118A.

The next node 118 in the example skipchain data structure 114 shown in FIG. 3 is the node 118C. The node 118C stores the data "C" and includes a node ID of "3FH" and a sequence number of 2. The node 118C also includes two redundancy nodes that point to the nodes 118A and 118B. The next node 118 in the example skipchain data structure 114 shown in FIG. 3 is the node 118D. The node 118D stores the data "D" and includes a node ID of "C88" and a sequence number of 3. The node 118D also specifies three redundancy nodes that point to the nodes 118A, 118B, and 118C.

Finally, the last internal node added to the example skipchain data structure 114 shown in FIG. 3 is the node 118E. The node 118E stores the data "E" and includes a node ID of "X9A" and a sequence number of 4. The node 118E also specifies three redundancy nodes that point to the nodes 118B, 118C, and 118D. The node 118E also specifies one skip node pointing to the node 118A.

As discussed above, the head node 118F is a copy of the last internal node 118 added to the skipchain data structure 114 (e.g. the node 118E in the example shown in FIG. 3). When a new internal node 118 is created in the skipchain data structure 114, contents of the head node may be utilized to create the new internal node 118. Additional details regarding this process are provided below with regard to FIG. 4.

FIG. 4 is a data structure diagram 114 showing aspects of the creation of a new node 118 in the example skipchain data structure 114 illustrated in FIG. 3. In the example shown in FIG. 4, a request has been received to add new data "F" to the skipchain data structure 114. When such a request is received to add new data to the skipchain data structure 114, a new node 118G is created and stored in the DHT 112 that includes the new data entry (i.e. the data "F" in the example shown in FIG. 4). The new node 118G specifies at least one redundancy node that points to the last internal node (i.e. a non-head node) that was added to the skipchain data structure 114. The new node can also specify one or more skip nodes. The redundancy nodes and skip nodes in the new node 118G can be generated based, at least in part, on the contents of the current head node 118F for the data structure.

Once the new node 118G has been created, the head node 118F for the skipchain data structure 114 is also updated in the DHT 112 to mirror the contents of the newly added node 118G. Additional details regarding the process described briefly above for generating the redundancy and skip nodes for a new node 118G from the head node 118F are provided below with regard to FIGS. 5A-5C. Additional details regarding the mechanism described above for adding a new node to the skipchain data structure 114 are provided below with regard to FIG. 6.

Figure 5A:
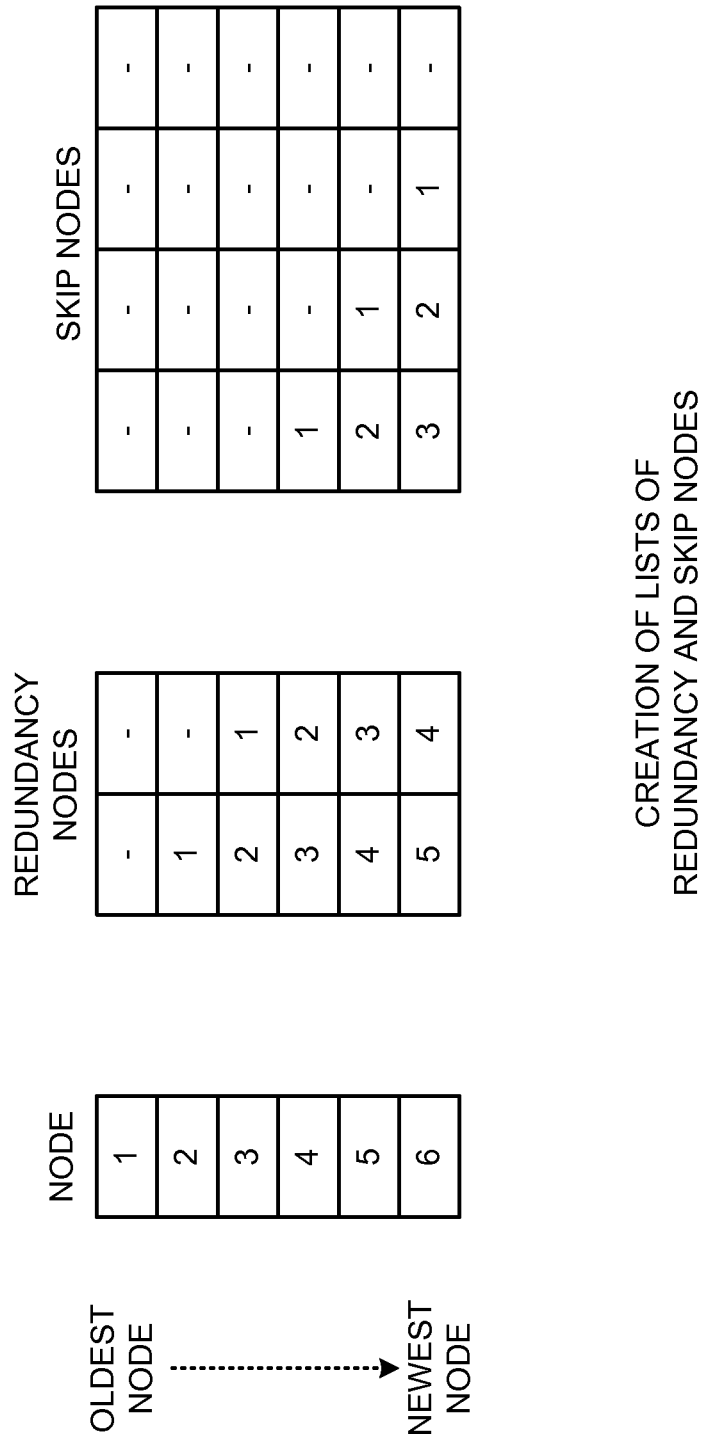
FIGS. 5A-5C are data structure diagrams showing aspects of the creation of lists of redundancy and skip nodes in a node in an example skipchain data structure utilized by a distributed hash table based logging service in one configuration disclosed herein.
Figure 5B:
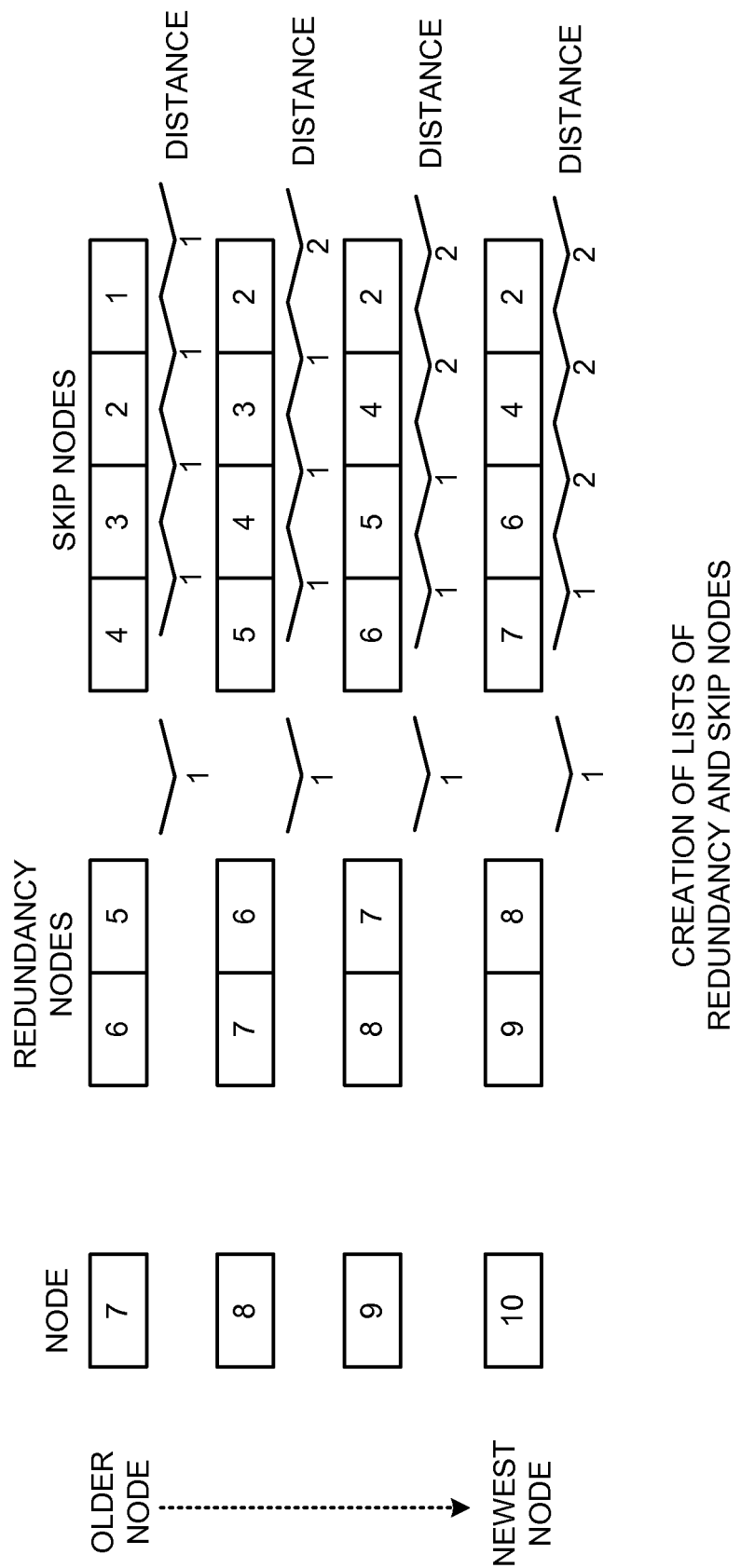
Figure 5C:
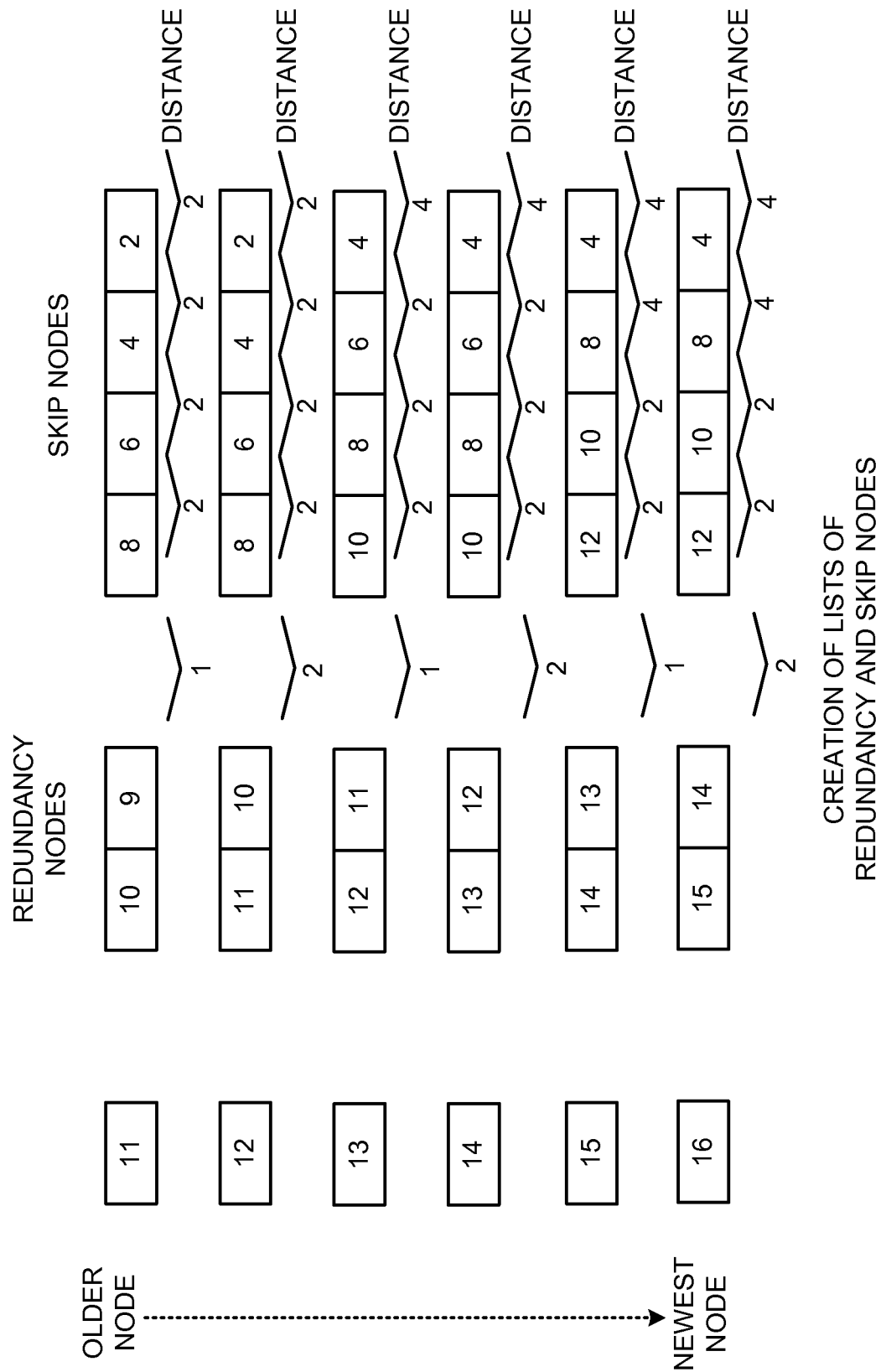

FIGS. 5A-5C are data structure diagrams showing aspects of the creation of the redundancy nodes 202E and skip nodes 202F in an example skipchain data structure 114 created by the DHT based logging service 102 in one configuration disclosed herein. In the example shown in FIGS. 5A-5C, an example skipchain data structure 114 has been created that includes 14 nodes 118, numbered in the order they were created from 1-14. In this example, the nodes 118 in the skipchain data structure 114 include a maximum of two redundancy nodes and four skip nodes. FIGS. 5A-5C illustrate the creation of the skip nodes and the redundancy nodes in the example skipchain data structure 114.

As illustrated in FIGS. 5A-5C, the redundancy nodes for a new node 118 can be generated from redundancy nodes contained in the current head node of the skipchain data structure 114 which, as discussed above, is a copy of the last created internal node 118. In order to accomplish this, the redundancy nodes are read from the current head node, shifted over, and a new redundancy node is added that points to the previously created node 118 in the skipchain data structure 114.

For instance, when a new node 118 numbered '5' in FIG. 5A is created, the redundancy nodes '3' and '2' are read from the current head node. The redundancy nodes are then shifted so that the node '2' falls out of the list of redundancy nodes (i.e. to enforce the limit that each node include a maximum of two redundancy nodes in this example). A redundancy node is then added that points to the previously created internal node 118 in the skipchain data structure 114 (e.g. the node 118 number '4' in FIG. 5A). In this manner, the new node 118 numbered '5' in FIG. 5A is created with redundancy nodes '4' and '3'. The redundancy nodes for other nodes are created in a similar fashion as indicated in FIGS. 5A-5C.

As discussed above, skip nodes for the nodes 118 in the skipchain data structure 114 are selected deterministically (as opposed to probabilistically) such that the distance in nodes 118 between the skip nodes is a base-two value. In this way, the skip nodes can be utilized to perform an efficient binary search of the nodes 118 of the skipchain data structure 114 in order to locate desired data without requiring a node-by-node traversal of the entire skipchain data structure 118.

In the example skipchain data structure 114 shown in FIGS. 5A-5C, there are no skip nodes for the first three nodes 118 since the redundancy nodes for nodes '2' and '3' point to the first two nodes. A skip node is, however, added to node '4.' Skip nodes are then added to subsequently added nodes 118 by obtaining the skip nodes from the head node, shifting the skip nodes, and adding a new skip node. For example, in node '5' shown in FIG. 5A, a new skip node pointing to node '2' has been added. Similarly, in node '6' a new skip node pointing to node '3' has been added. Likewise, in node '7' (shown in FIG. 5B), a skip node pointing to node '4' has been added. As shown FIG. 5B, the distance between skip nodes is maintained as a base-two value (e.g. a distance of one node between each of the skip nodes for node '7').

The shifting and adding of skip nodes proceeds in the manner described above as new nodes 118 are added to the skipchain data structure 114. It may, however, become necessary to modify the skip nodes for a particular node 118 in order to enforce the requirement that the distance between skip nodes 118 is a base-two value. For example, when the node '9' (shown in FIG. 5B) is added to the skipchain data structure 114, a simple shifting of the skip nodes would result in a list of skip nodes with a non base-two distance between them. Consequently, the node '4' is added to the skip nodes for the node '9' in place of the node '3.' Similar substitutions can be made to the skip nodes as other nodes 118 are added to the skipchain data structure 114 in order to ensure that the distance between nodes 118 remains a base-two value. As discussed above, this manner of selecting the skip nodes permits a binary search of the nodes 118 of the skipchain data structure 114 to be performed to locate desired data.

Figure 6:
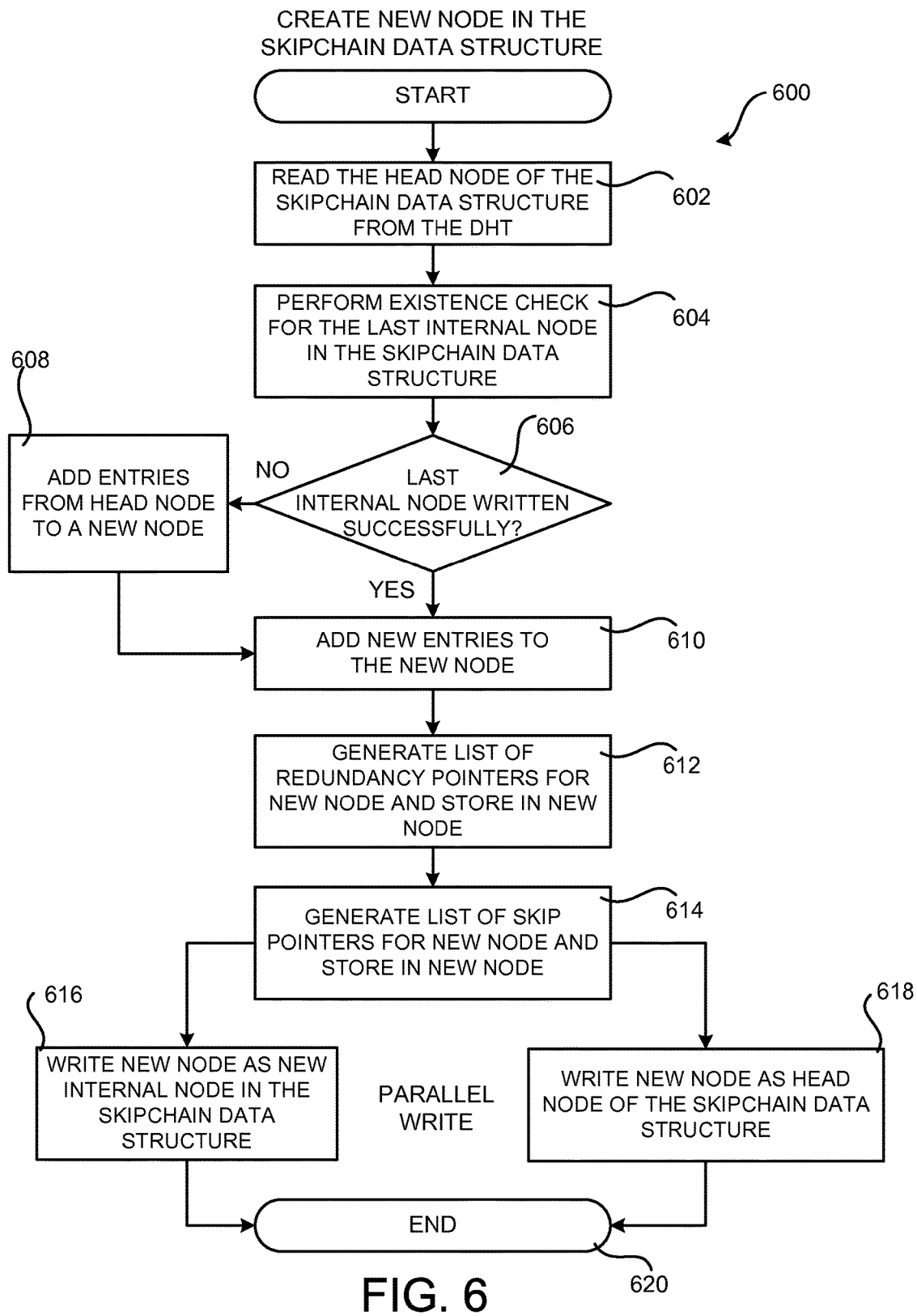
FIG. 6 is a flow diagram showing aspects of one illustrative routine disclosed herein for creating a new node in an example skipchain data structure utilized by a distributed hash table based logging service in one configuration disclosed herein.

FIG. 6 is a flow diagram showing aspects of one illustrative routine 600 disclosed herein for creating a new node 118 in the skipchain data structure 114 utilized by a DHT based logging service 102 in one configuration disclosed herein. It should be appreciated that the logical operations described herein with respect to FIG. 6 and the other figures are implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system.

Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein.

The routine 600 begins at operation 602, where the head node of the skipchain data structure 114 is read from the DHT 112. The routine 600 then proceeds to operation 604, where an existence check is performed in order to determine whether the last internal node 118 in the skipchain data structure 114 was successfully written to the DHT 112. For example, an attempt can be made to read the last internal node 118 from the DHT 112.

If the existence of the last written internal node 118 cannot be verified (i.e. the write failed), a mechanism may be utilized in order to fix the skipchain data structure 114 by adding data stored in the current head node to the new node to be created since the current head node is a copy of the last internal node written to the data structure 114. In order to accomplish this, the routine 600 proceeds from operation 606 to operation 608, where the data from the head node is copied to the new node 118 to be written to the DHT 112.

Figure 7A:
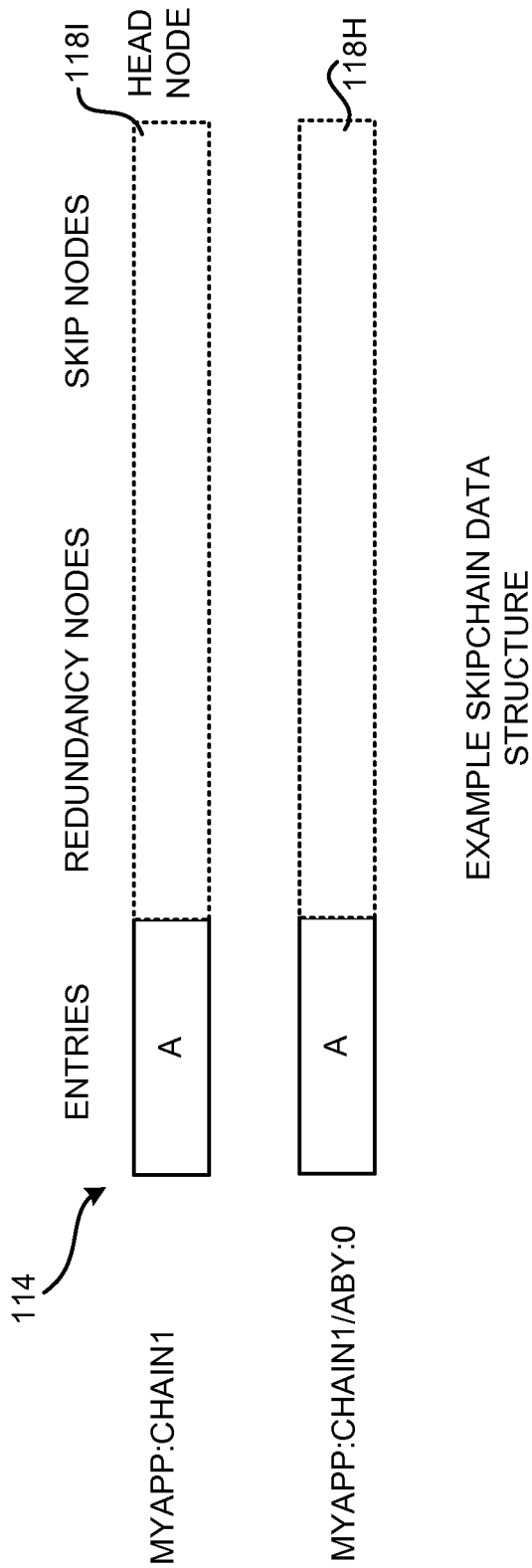
Figure 7B:
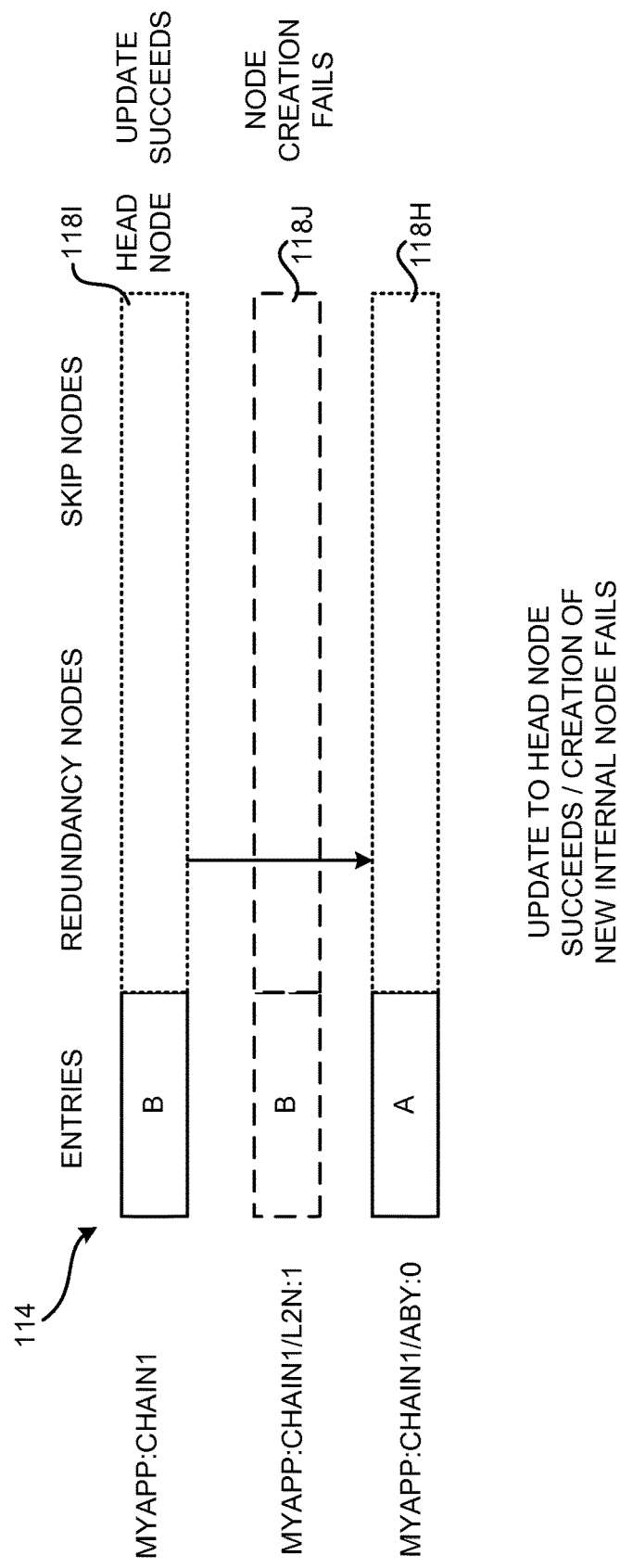

Referring momentarily to FIGS. 7A-7C, additional details will be provided regarding the mechanism discussed just above for fixing the skipchain data structure 114 following the failure to write the last internal node 118 to the DHT 112. In particular, FIGS. 7A-7C are data structure diagrams showing aspects of one mechanism disclosed herein for handling the failure of the creation of a new internal node 118 in the skipchain data structure 114, in one particular configuration disclosed herein. In the example shown in FIG. 7A, a simple skipchain data structure 114 has been created that includes a single internal node 118H storing the data 'A.' The example skipchain data structure 114 shown in FIG. 7A also includes a head node 118I, which is a copy of the internal node 118H and, therefore, also contains the data 'A.'

As shown in FIG. 7B, an attempt may be made to create a new node 118J in the skipchain data structure 114 storing the data 'B.' In this example, however, creation of the new node 118J in the DHT 112 fails. The updating of the head node 118I, however, succeeds and, as a result, the head node 118I now contains the data 'B.'

As shown in FIG. 7C, a request may be subsequently received to create yet another new node 118K in the skipchain data structure 114 that contains the data 'C.' As discussed briefly above, when such a request is received, an attempt is made to verify the existence of the last internal node 118 (i.e. the node 118J) in the DHT 112. In this example, the node 118J was not successfully written. As a result, the data from the head node (i.e. the data 'B') is also added to the new node to be written to the skipchain data structure 114. Consequently, the new node 118K includes both data 'B' and 'C' rather than just the data 'C.' The head node 118I is then updated to mirror the contents of the new node 118K. In this way, the content of the head node 118I can be utilized to recover from a failure to write a new internal node 118 to the skipchain data structure 114. The content added to the head node 118I will be purged following the next successful write of an internal node 118 to the skipchain data structure 114.

Referring back now to FIG. 6, the routine 600 proceeds from operation 608 to operation 610, where a new node is constructed for inclusion in the DHT 112. In particular, the data to be added to the skipchain data structure 114 is added to the new node at operation 610. The routine 600 then proceeds to operation 612, where the list of redundancy pointers is created from the current head node in the manner described above. Additionally, the list of skip pointers for the new node is also generated at operation 612 in the manner described above. The other fields 202 in the new node can also be populated in the manner described above.

Once the new node has been created in memory, parallel writes can be performed to the DHT to write both the new internal node and the new head node. In particular, the new node is written as a new internal node 118 in the skipchain data structure 114 at operation 616. Similarly, the new node is written as the head node of the skipchain data structure 114 at operation 618. The routine 600 then continues from operations 616 and 618 to operation 620, where it ends.

It should be appreciated that, in some configurations, an optimization may be implemented that allows the routine 600 described above to eliminate the reads performed at operations 602 and 604 and, thereby, to reduce latency. In order to avoid these read operations, the DHT based logging service 102 can provide a response to callers that includes the current contents of the head node of the skipchain data structure 114 along with a binary value indicating whether the last internal node 118 in the data structure 114 was successfully written. The current contents of the head node may be provided in a way that is opaque to the callers and, therefore, cannot be manipulated by the callers. Additionally, a caller can specify whether they would like to utilize this optimization in some configurations.

On a subsequent call to create a new node 118 in the data structure 114, such a caller can pass the binary value and the contents of the head node to the DHT based logging service 102. The DHT based logging service 102 can then utilize this data to perform the write operations described above rather than performing the reads at operations 602 and 604. Other types of performance optimizations can also be utilized.

Figure 8A:
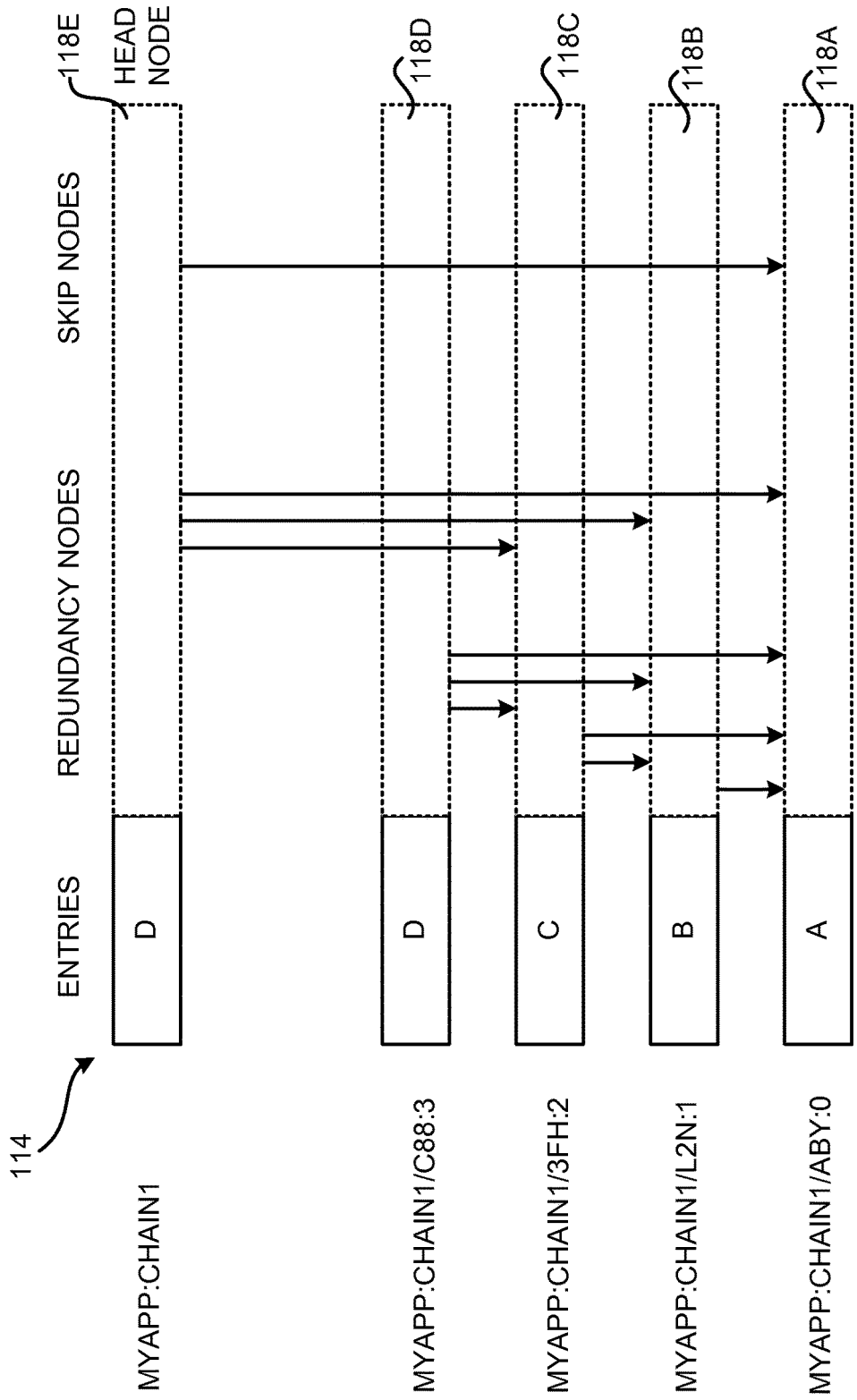
FIGS. 8A and 8B are data structure diagrams showing aspects of one mechanism disclosed herein for compacting nodes in a skipchain data structure, in one particular configuration disclosed herein.
Figure 8B:
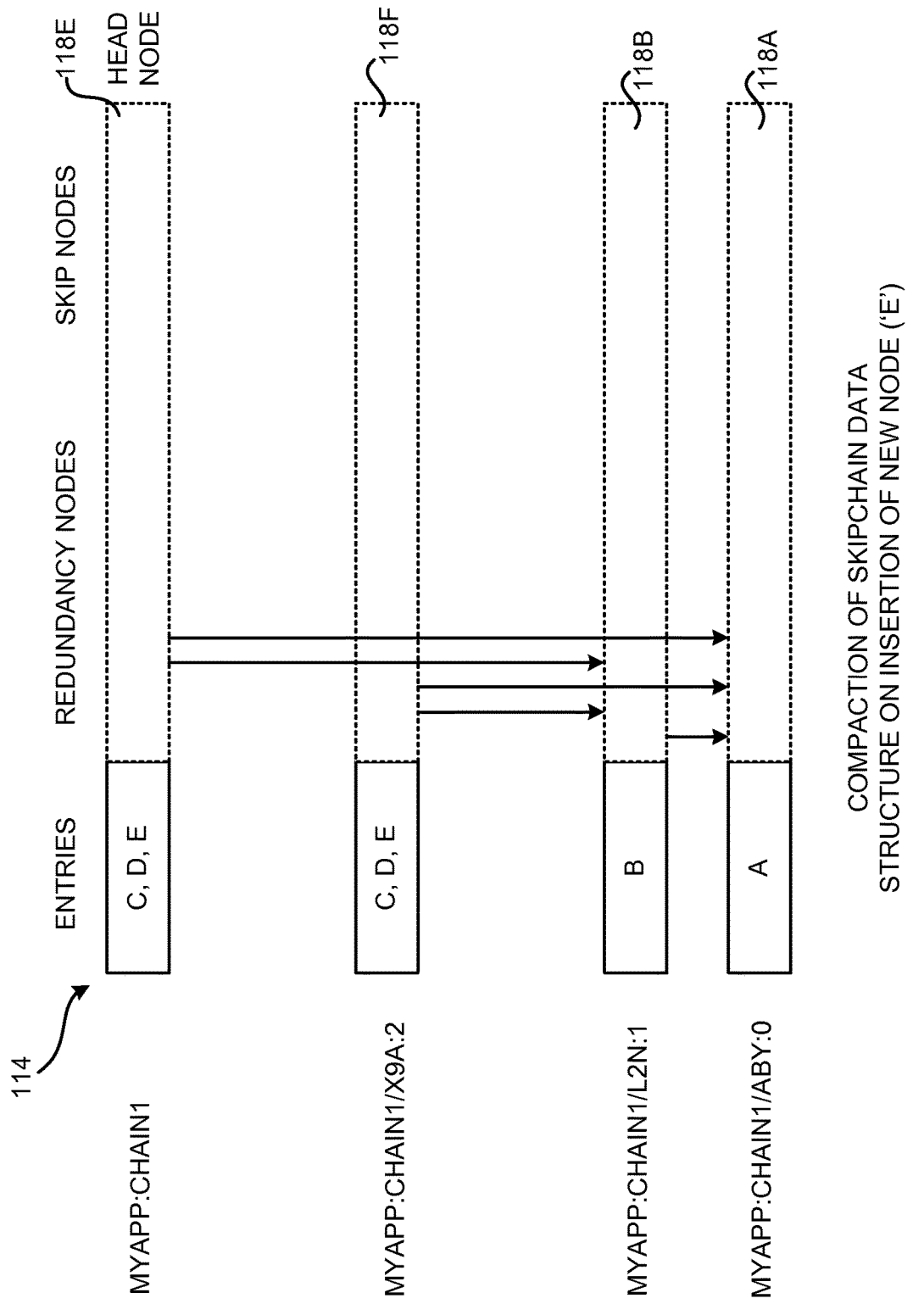

FIGS. 8A and 8B are data structure diagrams showing aspects of one mechanism disclosed herein for compacting nodes 118 in a skipchain data structure 114, in one particular configuration disclosed herein. In the example shown in FIG. 8A, a skipchain data structure 114 has been created that includes the nodes 118A-118D, storing the data 'A'-'D', respectively. The skipchain data structure 114 shown in FIGS. 8A and 8B also includes a head node 118E, which includes the content from the last written internal node (i.e. the content 'D' from the node 118D).

In order to compact the skipchain data structure 114, a mechanism can be utilized that functions similarly to the mechanism described above for correcting for the failure to write a new internal node 118 to the skipchain data structure 114. In particular, and as illustrated in FIG. 8B, when a request is received to write new data to the skipchain data structure 114 (in this example, the data 'E'), data is read from one or more consecutive nodes 118 (the nodes 118C and 118D in this example) at the head of the skipchain data structure 114 and added to the new node 118F. Consequently, the new node 118F (and the head node 118E) includes the data 'C', 'D', and 'E' in this example rather than only the data 'E.' The consecutive nodes 118 from which data was read can then be removed from the DHT 114. Other mechanisms can also be utilized to compact the nodes in the skipchain data structure 114 in other configurations.

It should be appreciated that compaction of the skipchain data structure 114 might present challenges to maintaining a stable pointer (which might be referred to herein as a "cursor") for reading from the skipchain data structure 114. For instance, in the example shown in FIGS. 8A and 8B, a cursor pointing to the node 118C might become invalid following the compaction of the example skipchain data structure 114. In order to address this possibility, the cursor is based not only on the node ID 202B, but also upon the prior entry count 202C. In this way, the cursor can reflect the proper node 118 even when nodes 118 in the skipchain data structure 114 are compacted.

It should also be appreciated that the different nodes 118 within the skipchain data structure 114 can be stored by different storage services in some configurations. In this way, the skipchain data structure 114 can span multiple storage services, such as the key/value storage service 108. Additionally, in some configurations nodes 118 that have been compacted in the manner described above with regard to FIGS. 8A and 8B might also be stored by different storage services. For example, compacted nodes 118 might be storage in a storage service that is optimized to handle the storage of larger amounts of data and, therefore, offers a lower cost to store the same amount of data than the key/value storage service 108. Other storage services might also be utilized to store compacted and non-compacted nodes 118.

FIG. 9 is a network diagram showing aspects of a distributed computing environment that might be utilized to provide an operating environment for the DHT based logging service 102 disclosed herein. The distributed computing environment shown in FIG. 9 provides a brief, general description of a suitable computing environment in which the configurations described herein can be implemented. The distributed computing environment shown in FIG. 9 is configured using a service-oriented architecture one implementation. Other configurations might also be utilized.

The distributed computing environment shown in FIG. 9 can provide computing resources for executing distributed programs on a permanent or an as-needed basis. These computing resources can also be utilized to implement a DHT 112 for providing the functionality described herein. The computing resources provided by the distributed computing environment can include various types of resources, such as data processing resources, data storage resources, data communication resources, and the like. Each type of computing resource can be general-purpose or can be available in a number of specific configurations. For example, data processing resources can be available as virtual machine instances. The instances can be configured to execute programs, including Web servers, application servers, media servers, database servers, and other types of components such as those described in detail above. Data storage resources can include file storage devices, block storage devices, and the like. Each type or configuration of computing resource can be available in different sizes, such as large resources, consisting of many processors, large amounts of memory, and/or large storage capacity, and small resources consisting of fewer processors, smaller amounts of memory, and/or smaller storage capacity.

The computing resources provided by the distributed computing environment shown in FIG. 9 are furnished in one configuration by server computers and other components operating in one or more data centers 902A-902D (which might be referred to herein singularly "as a data center 902" or collectively as "the data centers 902"). The data centers 902 are facilities utilized to house and operate computer systems and associated components for providing a distributed computing environment. The data centers 902 typically include redundant and backup power, communications, cooling, and security systems. The data centers 902 might also be located in geographically disparate locations. One illustrative configuration for a data center 902 that implements aspects of the technologies disclosed herein for providing a DHT based logging service 102 will be described below with regard to FIG. 10.

Users of the distributed computing environment illustrated in FIG. 9 can access the computing resources provided by the data centers 902 over a wide-area network ("WAN") 904. Although a WAN 904 is illustrated in FIG. 9, it should be appreciated that a local-area network ("LAN"), the Internet, or any other networking topology known in the art that connects the data centers 902 to remote customers and other users can be utilized. It should also be appreciated that combinations of such networks might also be utilized.

The distributed computing environment might provide various interfaces through which aspects of its operation can be configured. For instance, various APIs such as those described above can be exposed by components operating in the distributed computing environment shown in FIG. 9 for configuring various aspects of its operation and utilizing various aspects of the functionality that it provides. Other mechanisms for configuring the operation of components in the distributed computing environment and for utilizing these components might also be utilized.

According to configurations disclosed herein, the capacity of resources provided by the distributed computing environment can be scaled in response to demand. In this regard, scaling refers to the process of instantiating (which might also be referred to herein as "launching" or "creating") or terminating (which might also be referred to herein as "de-scaling") instances of computing resources in response to demand. Auto scaling is one mechanism for scaling computing resources in response to increases or lulls in demand for the resources. Additional details regarding the functionality provided by the data centers 902 will be provided below with regard to FIG. 10.

Figure 10:
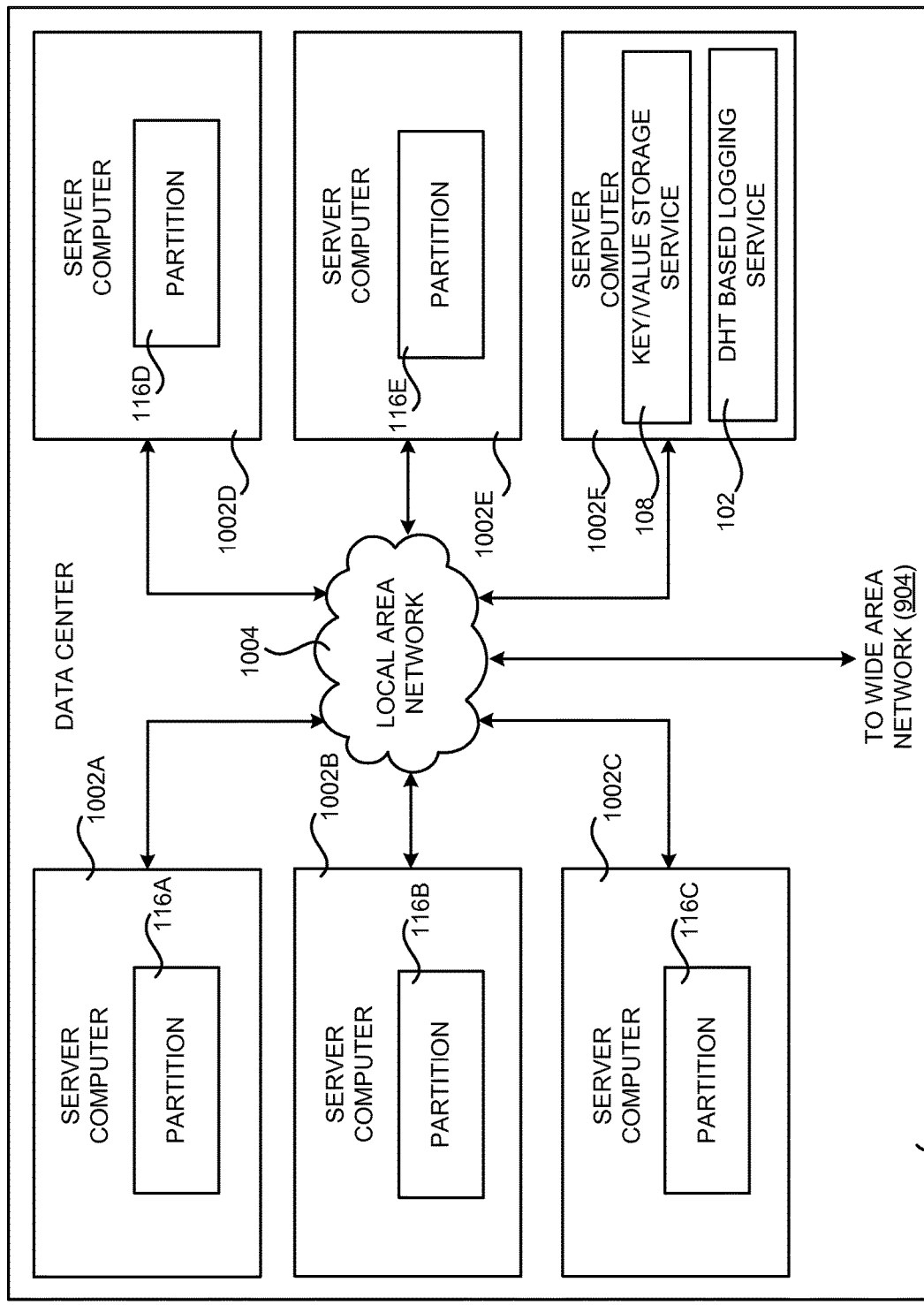
FIG. 10 is a network diagram illustrating aspects of a data center that might be utilized to implement the technologies presented herein for providing a distributed hash table based logging service, according to various configurations.

FIG. 10 is a computing system diagram that illustrates a configuration for a data center 902A that might be utilized to implement the DHT based logging service 102 described above. The example data center 902A shown in FIG. 10 includes several server computers 1002A-1002F (which might be referred to herein singularly as "a server computer 1002" or in the plural as "the server computers 1002") for providing computing resources for executing distributed programs. These computing resources might be utilized to implement a DHT 112 and/or to implement the DHT based logging service 102.

The server computers 1002 can be standard tower or rack-mount server computers configured appropriately for executing a distributed program or providing other functionality. For example, the server computers 1002 might be configured to store partitions 116, such as those described above with regard to FIG. 1. In the data center 902A shown in FIG. 10, for example, the server computer 1002A stores the partition 116A. Similarly, the server computer 1002B stores the partition 116B. Likewise, the server computer 1002C stores the partition 116C, the server computer 1002D stores the partition 116D, and the server computer 1002E stores the partition 116E. Other partitions 116 might also be stored on other server computers located in other data centers 902. Additionally, each server computer 1002 might store more than one partition 116. These server computers 1002 might also store and execute software components (not shown) for receiving and responding to requests to store and retrieve data from a partition 116, for creating new partitions 116, and for performing other functions relating to the creation and management of a DHT 112. The server computers 1002 might execute program components for managing other aspects of the configuration and operation of the key/value storage service 108 and the DHT 112.

The data center 902A shown in FIG. 10 also includes one or more server computers 1002, such as the server computer 1002F, that execute software components for providing aspects of the functionality described above. In particular, the server computer 1002F might execute an instance of the key/value storage service 108 and/or the DHT based logging service 102. The server computer 1002F might also execute other software components not specifically shown in FIG. 10.

In the example data center 902A shown in FIG. 10, an appropriate LAN 1004 is utilized to interconnect the server computers 1002. The LAN 1004 is also connected to the WAN 904 illustrated in FIG. 9. It should be appreciated that the network topology illustrated in FIGS. 9 and 10 has been greatly simplified for discussion purposes and that many more networks and networking devices can be utilized to interconnect the various computing systems disclosed herein. Appropriate load balancing devices or software modules might also be utilized for balancing a load between each of the data centers 902, between each of the server computers 1002 in each data center 902, or between virtual machine instances executing within the distributed computing environment. These network topologies and devices should be apparent to those skilled in the art.

It should also be appreciated that the data center 902A described in FIG. 10 is merely illustrative and that other implementations might be utilized. Additionally, it should be appreciated that the disclosed functionality might be implemented in software, hardware or a combination of software and hardware. Other implementations should be apparent to those skilled in the art. Additional details regarding one computer architecture for implementing the server computers 1002 will be described below with regard to FIG. 11.

Figure 11:
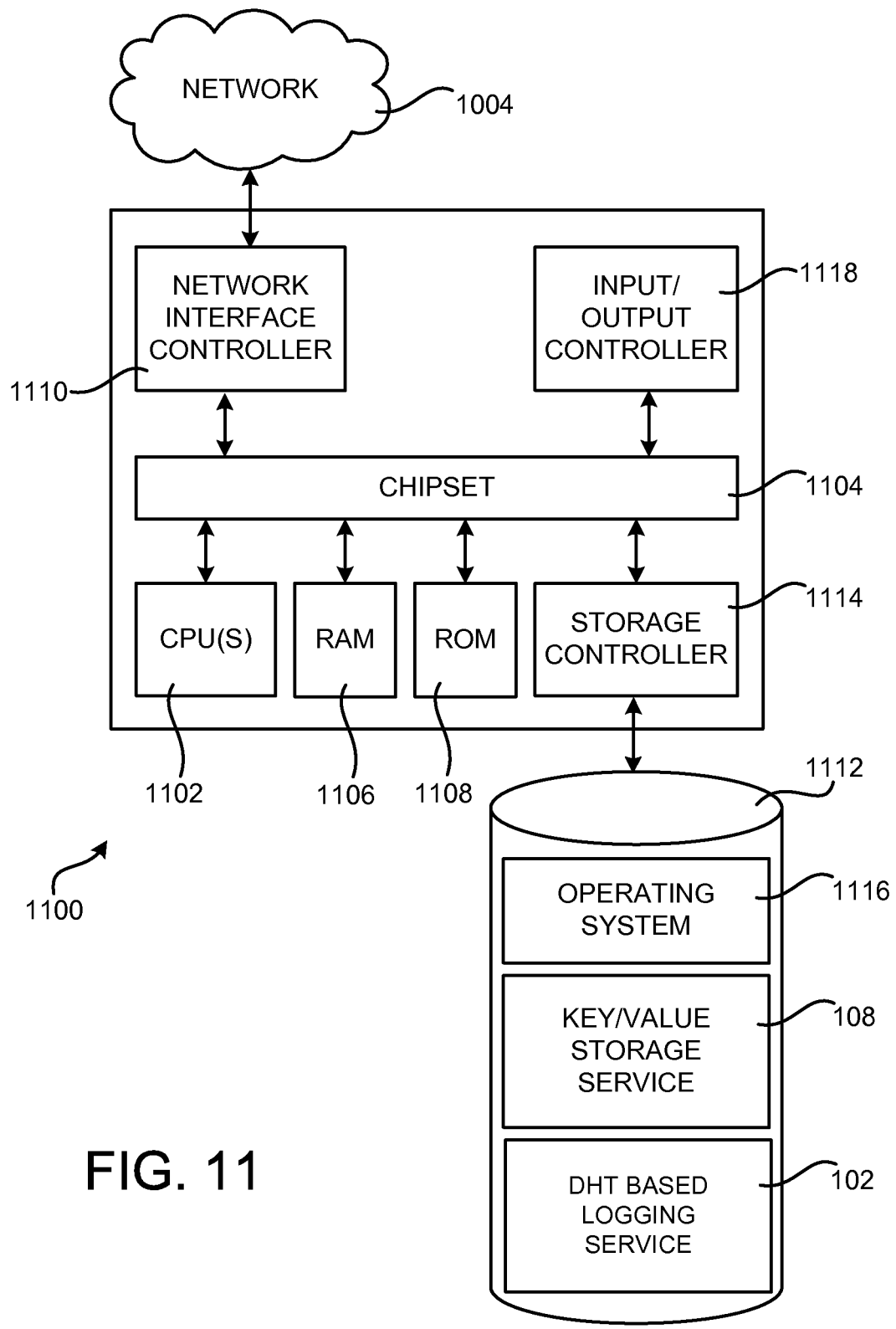
FIG. 11 is a computer architecture diagram showing one illustrative computer hardware architecture for implementing a computing device that might be utilized to implement aspects of the various configurations presented herein.

FIG. 11 shows an example computer architecture for a computer 1100 capable of executing the program components described above for providing the DHT based logging service 102 and the other functionality disclosed herein. The computer architecture shown in FIG. 11 illustrates a conventional server computer, workstation, desktop computer, laptop, tablet, network appliance, e-reader, smartphone, or other computing device, and can be utilized to execute any aspects of the software components presented herein described as executing within the data centers 902A-902N, on the server computers 1002A-1002N, or on any other computing system mentioned herein.

The computer 1100 includes a baseboard, or "motherboard," which is a printed circuit board to which a multitude of components or devices can be connected by way of a system bus or other electrical communication paths. In one illustrative configuration, one or more central processing units ("CPUs") 1102 operate in conjunction with a chipset 1104. The CPUs 1102 can be standard programmable processors that perform arithmetic and logical operations necessary for the operation of the computer 1100.

The CPUs 1102 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1104 provides an interface between the CPUs 1102 and the remainder of the components and devices on the baseboard. The chipset 1104 provides an interface to a random access memory ("RAM") 1106, used as the main memory in the computer 1100. The chipset 1104 can further provide an interface to a computer-readable storage medium such as a read-only memory ("ROM") 1108 or non-volatile RAM ("NVRAM") for storing basic routines that help to startup the computer 1100 and to transfer information between the various components and devices. The ROM 1108 or NVRAM can also store other software components necessary for the operation of the computer 1100 in accordance with the configurations described herein.

The computer 1100 can operate in a networked environment using logical connections to remote computing devices and computer systems through a network, such as the local area network 1004. The chipset 1104 can include functionality for providing network connectivity through a NIC 1110, such as a gigabit Ethernet adapter. The NIC 1110 is capable of connecting the computer 1100 to other computing devices over the network 1004. It should be appreciated that multiple NICs 1110 can be present in the computer 1100, connecting the computer to other types of networks and remote computer systems.

The computer 1100 can be connected to a mass storage device 1112 that provides non-volatile storage for the computer. The mass storage device 1112 can store system programs, application programs, other program modules, and data, which have been described in greater detail herein. The mass storage device 1112 can be connected to the computer 1100 through a storage controller 1114 connected to the chipset 1104. The mass storage device 1112 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 can store data on the mass storage device 1112 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1112 is characterized as primary or secondary storage, and the like.

For example, the computer 1100 can store information to the mass storage device 1112 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the mass storage device 1112 by detecting the physical states or characteristics of one or more particular locations within the physical storage units.

In addition to the mass storage device 1112 described above, the computer 1100 can have access to other computer-readable storage media to store and retrieve information, such as program modules, data structures, or other data. It should be appreciated by those skilled in the art that computer-readable storage media can be any available media that provides for the storage of non-transitory data and that can be accessed by the computer 1100.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1112 can store an operating system 1116 utilized to control the operation of the computer 1100. According to one configuration, the operating system comprises the LINUX operating system. According to another configuration, the operating system comprises the WINDOWS® SERVER operating system from MICROSOFT Corporation. According to a further configuration, the operating system comprises the UNIX operating system. It should be appreciated that other operating systems can also be utilized. The mass storage device 1112 can store other system or application programs and data utilized by the computer 1100, such as the partitions 102, key/value storage service 108, the DHT based logging service 102, and/or the other software components and data described above. The mass storage device 1112 might also store other programs and data not specifically identified herein.

In one configuration, the mass storage device 1112 or other computer-readable storage media is encoded with computer-executable instructions which, when loaded into the computer 1100, transforms the computer from a general-purpose computing system into a special-purpose computer capable of implementing the configurations described herein. These computer-executable instructions transform the computer 1100 by specifying how the CPUs 1102 transition between states, as described above. According to one configuration, the computer 1100 has access to computer-readable storage media storing computer-executable instructions which, when executed by the computer 1100, perform the routine 600, described above with regard to FIG. 6 and the other operations described with reference to the other FIGS.

The computer 1100 can also include an input/output controller 1118 for receiving and processing input from a number of input devices, such as a keyboard, a mouse, a touchpad, a touch screen, an electronic stylus, or other type of input device. Similarly, the input/output controller 1118 can provide output to a display, such as a computer monitor, a flat-panel display, a digital projector, a printer, a plotter, or other type of output device. It will be appreciated that the computer 1100 might not include all of the components shown in FIG. 11, can include other components that are not explicitly shown in FIG. 11, or can utilize an architecture completely different than that shown in FIG. 11.

Based on the foregoing, it should be appreciated that technologies for providing a DHT based logging service 102 have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A computer-implemented method for providing a distributed hash table (DHT) based event log, the method comprising:

maintaining a data structure in the DHT for storing an event log, the DHT including two or more partitions, the data structure comprising a plurality of immutable nodes, the plurality of immutable nodes comprising one or more entries of the event log that are distributed across the two or more partitions, data identifying one or more redundancy nodes in the data structure, and data identifying one or more skip nodes in the data structure; and receiving a request to add a new entry in the event log, the request including a key identifying a partition of the two or more partitions at which the new entry of the event log is to be stored and, in response to the request, storing a new immutable node in the DHT containing the new entry, the new immutable node specifying at least one redundancy node pointing to a last internal node in the data structure, specifying one or more deterministically selected skip nodes, and storing a head node for the data structure in the DHT, the head node comprising a copy of the new immutable node.

2. The computer-implemented method of claim 1, wherein each immutable node further comprises data identifying the immutable node and data identifying the data structure.

3. The computer-implemented method of claim 1, wherein each immutable node further comprises data identifying a number of entries of the event log located in previous immutable nodes.

4. The computer-implemented method of claim 1, wherein the redundancy nodes comprise node identifiers for one or more sequential nodes in the data structure.

5. The computer-implemented method of claim 1, wherein the one or more skip nodes comprise node identifiers for a plurality of immutable nodes in the data structure, and wherein the one or more skip nodes are deterministically selected such that a distance in nodes between any two skip nodes is a base-two value.

6. The computer-implemented method of claim 1, further comprising:

determining that the last internal node in the data structure was not written successfully; and adding one or more entries of the event log contained in the head node to the new immutable node.

7. The computer-implemented method of claim 1, further comprising:

adding one or more entries of the event log from one or more consecutive nodes at a head of the data structure to the new immutable node; and removing the one or more consecutive nodes from the DHT.

8. A system for storing data in a distributed hash table (DHT), the system comprising:

a plurality of computer systems storing at least a portion of the DHT in two or more partitions, the DHT having a data structure stored therein comprising a plurality of nodes, the plurality of nodes of the data structure comprising one or more data entries that are distributed across the two or more partitions, data identifying one or more redundancy nodes in the data structure, and data identifying one or more deterministically selected skip nodes in the data structure, wherein a partition of the two or more partitions is associated with a key, the key identifying a partition of the two or more partitions at which a data entry of the data entries is stored; and at least one computer system configured to expose a network services application programming interface for appending data entries to the data structure stored in the DHT and for reading data entries from the data structure stored in the DHT.

9. The system of claim 8, wherein the one or more redundancy nodes comprise node identifiers for one or more sequential nodes in the data structure.

10. The system of claim 8, wherein the one or more deterministically selected skip nodes comprise node identifiers for a plurality of nodes in the data structure, and wherein the one or more deterministically selected skip nodes are deterministically selected such that a distance in nodes between any two of the one or more deterministically selected skip nodes is a base-two value.

11. The system of claim 8, wherein the at least one computer system is further configured to:

receive a request to add a new data entry; and store a new node in the DHT containing the new data entry, the new node specifying at least one redundancy node pointing to a last internal node in the data structure, and storing a head node for the data structure in the DHT, the head node comprising a copy of the new node.

12. The system of claim 11, wherein the at least one computer system is further configured to:

determine that the last internal node in the data structure was not written successfully; and add one or more data entries contained in the head node to the new node.

13. The system of claim 11, wherein the at least one computer system is further configured to:

add one or more data entries from one or more consecutive nodes at a head of the data structure to the new node; and remove the one or more consecutive nodes from the DHT.

14. A computer-readable storage medium having computer-executable instructions stored thereupon which, when executed by one or more computers, cause the one or more computers to:

store a data structure in a distributed hash table (DHT), the DHT including two or partitions, the data structure comprising a plurality of immutable nodes that are distributed across the two or more partitions, the plurality of immutable nodes comprising data identifying one or more deterministically selected skip nodes in the data structure, wherein a partition of two or more partitions is associated with a key, the key identifying the partition of the two or more partitions at which a portion of the data is stored, and wherein the plurality of immutable nodes further comprise one or more data entries and data identifying one or more redundancy nodes in the data structure;

receive a request to add a new data entry; and store a new immutable node in the DHT containing the new data entry, the new immutable node specifying at least one redundancy node pointing to a last internal node in the data structure, and storing a head node for the data structure in the DHT, the head node comprising a copy of the new immutable node.

15. The computer-readable storage medium of claim 14, having further computer-executable instructions stored thereupon to:

determine that the last internal node in the data structure was not written successfully; and add one or more data entries contained in the head node to the new immutable node.

16. The computer-readable storage medium of claim 14, having further computer-executable instructions stored thereupon to:

add one or more data entries from one or more consecutive nodes at a head of the data structure to the new immutable node; and remove the one or more consecutive nodes from the DHT.

17. The computer-readable storage medium of claim 14, wherein the DHT further comprises one or more redundancy nodes, and wherein the one or more redundancy nodes comprise node identifiers for one or more sequential nodes in the data structure.

18. The computer-readable storage medium of claim 14, wherein the one or more deterministically selected skip nodes comprise node identifiers for a plurality of immutable nodes in the data structure, and wherein the one or more deterministically selected skip nodes are deterministically selected such that a distance in nodes between any two skip nodes is a base-two value.

19. The computer-readable storage medium of claim 14, wherein an immutable node of the plurality of immutable nodes further comprises a node identifier, a sequence number, data identifying the data structure, and data identifying a number of data entries stored in previous nodes in the data structure.

20. The system of claim 8, further comprising an immutable node comprising data identifying the data structure.

* * * * *